(12) United States Patent
Zayas

(10) Patent No.: US 7,734,869 B1
(45) Date of Patent: Jun. 8, 2010

(54) INTERFACES FOR FLEXIBLE STORAGE MANAGEMENT

(75) Inventor: Edward Ramon Zayas, Milpitas, CA (US)

(73) Assignee: Netapp, Inc., Sunnyvale, CA (US)

( * ) Notice: Subject to any disclaimer, the term of this patent is extended or adjusted under 35 U.S.C. 154(b) by 580 days.

(21) Appl. No.: 11/118,224

(22) Filed: Apr. 28, 2005

(51) Int. Cl.
*G06F 12/00* (2006.01)

(52) U.S. Cl. .............................. 711/114; 711/E12.025; 711/154; 710/5

(58) Field of Classification Search ........................ None
See application file for complete search history.

(56) References Cited

U.S. PATENT DOCUMENTS

| | | | |
|---|---|---|---|
| 5,606,702 A | 2/1997 | Diel et al. | |
| 5,617,527 A | 4/1997 | Kressin et al. | |
| 5,774,720 A | 6/1998 | Borgendale et al. | |
| 5,867,686 A | 2/1999 | Conner et al. | |
| 6,640,278 B1 * | 10/2003 | Nolan et al. | 711/6 |
| 6,983,303 B2 * | 1/2006 | Pellegrino et al. | 709/203 |
| 2002/0019908 A1 | 2/2002 | Reuter et al. | |
| 2002/0083216 A1 | 6/2002 | Hickson et al. | |
| 2002/0174129 A1 | 11/2002 | Aldrich et al. | |
| 2002/0184207 A1 | 12/2002 | Anderson et al. | |
| 2002/0188592 A1 | 12/2002 | Leonhardt et al. | |
| 2002/0191619 A1 | 12/2002 | Shafer | |
| 2003/0225800 A1 | 12/2003 | Kavuri | |
| 2004/0019587 A1 | 1/2004 | Fuh et al. | |
| 2004/0133718 A1 | 7/2004 | Kodama et al. | |
| 2004/0214561 A1 | 10/2004 | Date et al. | |
| 2004/0267766 A1 | 12/2004 | Marek et al. | |
| 2005/0010620 A1 | 1/2005 | Silvers et al. | |
| 2005/0033757 A1 | 2/2005 | Greenblatt et al. | |
| 2005/0060693 A1 | 3/2005 | Robison et al. | |
| 2006/0063519 A1 | 3/2006 | Rajaram | |
| 2006/0136368 A1 | 6/2006 | Young-Lai et al. | |
| 2008/0263112 A1 | 10/2008 | Shaath et al. | |

FOREIGN PATENT DOCUMENTS

| | | |
|---|---|---|
| EP | 1693757 | 8/2006 |
| WO | WO-92/17838 | 10/1992 |

OTHER PUBLICATIONS

PCT International Search Report and Written Opinion for PCT/US2006/007785, Int'l filing date: Mar. 3, 2006; Mailing Date: Aug. 8, 2006 (16 pages).

(Continued)

*Primary Examiner*—Reginald G Bragdon
*Assistant Examiner*—Eric Loonan
(74) *Attorney, Agent, or Firm*—Perkins Coie LLP

(57) ABSTRACT

Interfaces for flexible storage management. An embodiment of a system includes a data storage, the data storage including one or more of a first storage system, the first storage system including a file structure that is coextensive with a set of memory devices, or a second storage system, the second storage system including a storage structure that is coextensive with a set of memory devices, the storage structure including zero or more file structures. The system further includes an interface system for the data storage, the interface system being used for both the first storage system and the second storage system.

23 Claims, 7 Drawing Sheets

OTHER PUBLICATIONS

"Network appliance powers up the storage grid-world's first dynamic virtualization engine . . . ". CIMdata PLM Industry Summary Online Archive. Cimdata Newsletter 2004. www.cimdata.com/newsletter, Nov. 15, 2004.

"Introduction to Data ONTAP 7G". Network Appliance, Inc. Oct. 2005, pp. 1-6.

U.S. Appl. No. 12/113,172, filed Apr. 30, 2008 Wincklemann, et al. Disk-to-Disk Backup of Database Archive Logs.

U.S. Appl. No. 11/710,202, filed Feb. 22, 2007 Peter L. Smoot Data Management in a Data Storage System Using Data Sets.

U.S. Appl. No. 11/710,202, filed Feb. 22, 2007 Inventor: Peter L. Smoot Data Management in a Data Storage System Using Data Sets.

U.S. Appl. No. 11/088,631, filed Mar. 22, 2005 Inventor: Edward Zayas Shared Implementation For Multiple System and Interfaces.

U.S. Appl. No. 12/113,172, filed Apr. 30, 2008 Disk-to-Disk Backup of Database Archive Logs Inventor: Wincklemann et al.

Co-pending U.S. Appl. No. 11/088,631, filed Mar. 22, 2005.

Notice of Allowance mailed Nov. 3, 2009 in Co-pending U.S. Appl. No. 11/088,631, filed Mar. 22, 2005.

Non-Final Office Action mailed May 26, 2009 in Co-pending U.S. Appl. No. 11/088,631, filed Mar. 22, 2005.

Final Office Action mailed Dec. 10, 2008 in Co-pending U.S. Appl. No. 11/088,631, filed Mar. 22, 2005.

Non-Final Office Action mailed Mar. 28, 2008 in Co-pending U.S. Appl. No. 11/088,631, filed Mar. 22, 2005.

\* cited by examiner

INTERFACES FOR FLEXIBLE STORAGE MANAGEMENT

FIELD OF THE INVENTION

At least one embodiment of the present invention pertains to system interfaces, and more particularly to a method and apparatus to provide interfaces for flexible storage management.

BACKGROUND

A storage server is a special-purpose processing system used to store and retrieve data on behalf of one or more client processing systems ("clients"). A storage server can be used for many different purposes, such as to provide multiple users with access to shared data or to back up mission critical data.

A file server is an example of a storage server. A file server operates on behalf of one or more clients to store and manage shared files in a set of mass storage devices, such as magnetic or optical storage based disks or tapes. The mass storage devices may be organized into one or more volumes of Redundant Array of Inexpensive Disks (RAID). Another example of a storage server is a device that provides clients with block-level access to stored data, rather than file-level access, or a device that provides clients with both file-level access and block-level access.

A client may use interfaces to access and manage data maintained by a storage system, such as a file server. The interfaces may be in various formats, including command line interfaces, application programming interfaces (APIs), and others. Using such interfaces, a management system for a storage system may provide the ability to take management actions that are directed to the storage system, such as commands to create, destroy, and modify storage structures and files.

However, multiple different versions or types of storage systems may exist. In one example, the design of a storage system may be modified over time, with new versions of the system being developed. This change process may result in there being one or more legacy storage systems that require support, as well new systems that may utilize different types of data storage and file structures.

SUMMARY OF THE INVENTION

An embodiment of the invention provides for interfaces for flexible storage management.

An embodiment of a system includes multiple different kinds of data storage systems. An interface system provides access to all of the different types of storage systems.

Other aspects of the invention will be apparent from the accompanying figures and from the detailed description that follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Figure 1:
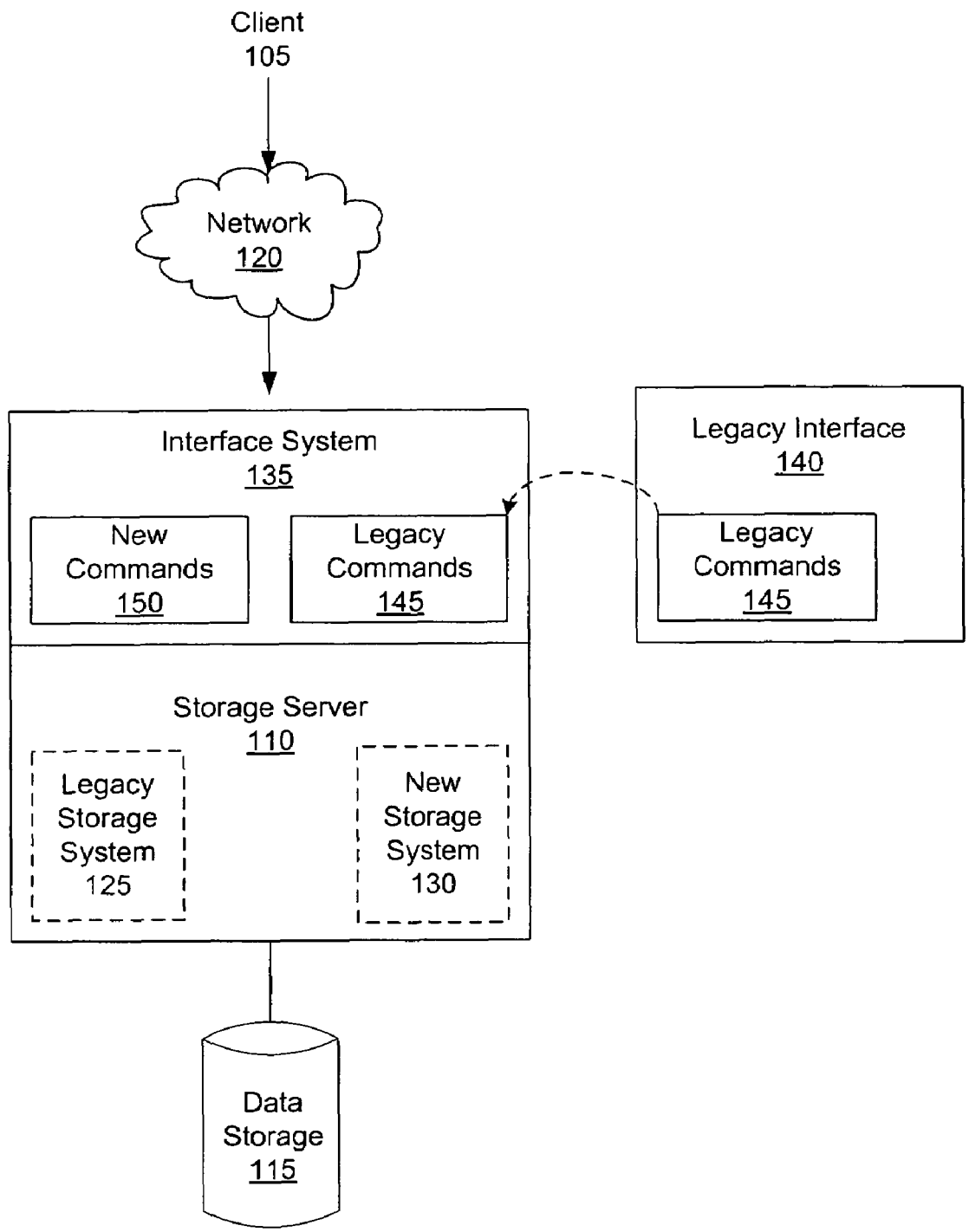
FIG. 1 illustrates an embodiment of interfaces for multiple types of storage systems.

A method and apparatus for providing interfaces for flexible storage management are described. As described in greater detail below, in certain embodiments of the invention interfaces are provided to support multiple storage systems.

An embodiment of the invention supports multiple different kinds of data storage systems. An interface system provides access to each of the different types of storage systems. For example, a pre-existing legacy storage system may continue to be utilized by users and supported by the system manufacturer, while a new storage system, which may be a new revised version of the legacy system, is also in use. In one possible example, the legacy storage system and the new storage system may differ in elements such as how each of the systems handles files and physical storage. An embodiment of the invention provides an interface system that will support both the legacy system and the new system.

For the purposes of this description, an "interface" is a program or portion of a program that connects two elements, such as connecting a user with an application or system. For example, an interface may be a user interface to connect a user with a storage system. An interface for a storage system may include, among other elements, a set of commands, messages, or other communications that allow the user to interact with the storage system. An interface may exist in various forms, which may include a command line interface to directly inputs instructions, a graphical user interface (GUI), or an application programming interface (API).

In a storage system, such as a storage server, there are both physical storage aspects and file system aspects that may require management. The physical storage aspect involves what may be referred to as storage structures, which are groups of storage devices. The storage structures may be said to reflect the block level storage of the storage server. In one example, a group of RAID disks may make up a certain storage structure. The storage server also has a file system, reflecting the file level storage of the storage server. In this aspect of the storage system, the data is stored in files according to some sets of rules regarding such issues as file hierarchy and other file conventions.

In one possible example, a legacy storage system may require that each volume of storage be in a one-to-one relationship with a set of memory devices, with the volume being coextensive with a memory aggregate. As used herein, a "volume" is an independent hierarchical file system that contains files, directories, and other storage constructs. The contents of a volume may be made visible to end users of the storage system over the network via such protocols as NFS (Network File System), CIFS (Common Internet File System), HTTP (Hypertext Transfer Protocol), and so on. Such volumes draw their physical blocks of storage from a set of disks organized into a particular RAID configuration, referred to as an "aggregate". As used in this description, "coextensive" means that a given aggregate contains a single volume completely, and that the given volume has exclusive ownership of all of the blocks of physical storage in this same containing aggregate. In the legacy storage system, any change in size of a volume requires the same change in the size of the aggregate. For this system, a set of memory devices may be referred to herein as an "aggregate", but, because a volume is coextensive with an aggregate, it may not have been necessary to refer to these concepts separately in the legacy system.

Another storage system, which may be a new or revised system, may allow the use of volumes (referred to as "flexible volumes" to distinguish these from the legacy type of volumes) that are not required to be coextensive with an aggregate. For this new type of storage system, each aggregate may include zero or more flexible volumes, and it is possible that the flexible volumes may be created, destroyed, and changed in size without changing the aggregate. (Greater detail regarding the storage systems is provided in FIG. 4.) An embodiment of the invention provides an interface system that may be used to provide commands for both the legacy storage system and the new storage system.

A legacy storage server may have had a legacy interface used to manage the data storage for the legacy storage server. The legacy interface was limited to commands that related to the legacy storage server operations. For example, the legacy interface may have been applicable to volumes that were coextensive with aggregates. Further, the legacy interface may not have distinguished between volumes and aggregates because of their coextensive nature. In one embodiment, a combined interface system is compatible with both the legacy system and a new storage server. The new storage server uses aggregates that are not tied to a one-to-one relationship with volumes, with each aggregate possibly including one or more flexible volumes. The combined interface system uses the commands from the legacy interface for both the legacy storage server and the new storage server. For the legacy storage server, the same commands and command formats for the legacy interface will be used in the combined interface system, and thus the use of the commands in the legacy system is not changed. For the new storage server, the commands for the legacy system may be expanded with additional arguments to apply to the new storage server, and new commands may be added that relate to new concepts that only apply to the new storage server.

In one embodiment of the invention, an interface system that provides commands to access and manage multiple types of storage systems, such as a legacy storage system and a new storage system, may be structured as two interfaces. In this embodiment, a storage structure interface (an "aggregate interface") is used to handle commands that relate to the storage structures of each of the storage systems. A file structure interface (a "volume interface") is used to handle commands that relate to the file structures for each of the storage systems.

In one embodiment of the invention, an interface system is provided to process commands either with a legacy type of storage server or a new type of storage server. In this example, the legacy system had a legacy interface that provided a set of commands relating to the legacy storage server. In this example, the legacy system has file structures (volumes) that are required to be coextensive with storage structures (aggregates) and the new storage server has storage structures (aggregates) that may include any number, zero or more, file structures (flexible volumes). The interface system for the storage servers includes the following elements:

(1) Separation of Volume and Aggregate Interfaces—The interface system includes a storage structure ("aggregate") interface that is separated from a file structure ("volume", including legacy volumes and new flexible volumes) interface. The aggregate interface handles commands that relate to storage structures, or block level storage. The volume interface handles commands that relate to file structures, or file level storage. The commands of the legacy interface are divided between the two interfaces, with the commands that addressed storage structures being assigned to the aggregate interface and the commands that addressed file structures being assigned to the volume interface.

(2) Operation of the Aggregate Interface—While the legacy storage server and the new storage server may vary in operation with regard to file structures and how these files structures relate to the storage structures, there are common operations that may be applied to the storage structures for each storage server. The aggregate interface provides a set of common commands to address the RAID groups that make up the aggregate storage structures. Each such command may refer to one or more aggregates. For the legacy storage server, the aggregate name is the same name as the name of the volume. For the new storage server, the aggregate name is tied to the names of the volumes that are located within the aggregate. With this process, the same commands relating to storage structures may be used for either the legacy storage server or the new storage server.

(3) Operation of the Volume Interface—For the volume interface, commands are separated into groups and handled as follows:

(a) Commands for Legacy Volumes and Flexible Volumes—Operations that relate to volumes and that differ for legacy volumes and new flexible volumes may use the same commands by extending legacy commands to include additional arguments. In this way, a command for the legacy interface that is addressed to a volume for the legacy storage system may be utilized for flexible volumes that operate in a different fashion for the new storage system. For example, a "create" command has a certain number of arguments for volumes in the legacy storage server, but has additional arguments for flexible volumes for the new storage server. In this manner, a relevant command is not modified for the legacy storage server and may be used in the same manner as in the legacy interface, but the command may also be used for the new storage server with different arguments, the different arguments distinguishing the different kinds of operations. If the arguments for such a command do not match the appropriate type of storage server, then an error condition will result.

(b) Commands that Affect Both Volumes and Aggregates—Commands that would apply to both a file structure and a storage structure (examples may be commands to destroy a structure, to take the storage off-line, or to restrict the storage) will make sense for both systems. For this reason, the commands for the legacy system may be used without modification for both the legacy storage server and the new storage server. The relevant volume or flexible volume name may be used as an argument for such a command.

(c) Commands for RAID-Only Operations—A volume command that has implications only for RAID operations (such as a "mirror" command that provides a mirror image of a structure) will operate in the same manner for each of the storage servers. For this reason, the commands for the legacy system may again be used without modification. The relevant legacy volume or flexible volume name may be used as an argument for such a command.

(d) New Commands for Flexible Volumes—Certain operations may only apply or make sense for the new storage servers, as such commands that reflect the new capabilities of flexible volumes. New commands may be added to the volume interface for these operations. A new command may, for example, relate to the reduction in size of a flexible volume, an operation that was not possible in the legacy storage system and thus an operation that was not contained in the legacy interface. The use of the new commands will have no effect on the legacy storage server. The addition of such commands will not create any duplication because the operations did not previously exist in the legacy storage server. If a legacy volume name for the first storage server is used, then an error condition may result.

In one embodiment of the invention, the interface system supports both the legacy storage server and the new storage server. The legacy storage server may be managed using the commands from the legacy interface, without any modification of the commands. The new storage server may be managed without creating a duplicate system. The commands for management of the new storage server are the commands for the legacy interface, with extension of arguments if needed, and additional commands if the operations are new. The characteristics of each storage server are reflected in the interfaces, and thus the interface commands will result in either an appropriate operation or error condition for each storage server. The commands for the first legacy storage server may be used without modification from the prior use in the legacy interface, with the operations for the new storage server also supported by legacy commands, with extension of the commands if needed for differing operations, or by new commands for new operations.

In one embodiment of the invention, a storage system interface includes an interface logic to enable an entity to communicate with a storage server that is capable of maintaining multiple volumes of data, with each volume that is maintained by the storage server being coextensive with an aggregate. The interface also includes an interface logic to enable an entity to communicate with a storage server that can maintain multiple volumes of data, with at least one of the volumes that is maintained by the storage server being capable of having a variable relationship to an aggregate.

An embodiment of the invention may be implemented in various environments. The environments may include file storage such as NAS (network attached storage), block-based storage such as SAN (storage area network), or mixed SAN and NAS environments. A SAN system generally provides for transferring data between computer system and storage devices, while a NAS is a file storage device that is accessed through a network. Interfaces may be utilized to access and manage multiple versions of such storage systems.

While the descriptions of embodiments of the invention herein generally refer to two storage systems, embodiments of the invention are not limited to two systems. Any number of different storage systems may be accessed with embodiments of interface systems.

FIG. 1 illustrates an embodiment of interfaces for multiple types of storage servers. In this illustration, a client 105 may be seeking to access a storage server 110 for the purpose of managing data contained a data storage 115, which may include one or more RAID groups. The client 105 may access the storage server via a network 120, which may include a local area network, the Internet, or any other kind of network or similar computer architecture. The storage server may represent one of multiple different types of storage servers. In one example, the storage server 110 may be a legacy type of storage server 125, or may be a new type of storage server 130.

The client 105 accesses the storage server 110 through an interface system 135, with the interface system 135 including commands that are compatible with each of the different types of storage servers. Further, the interface system utilizes a set of commands 145 that are derived from a legacy interface 140 that was provided for the legacy type of storage server. If the storage server 110 is the legacy type of storage server 125, then the commands 145 may be used in the same manner as the legacy interface 140. If the storage server is the new type of storage server, the commands 145 are used, with possible extensions in arguments if needed. In addition, the interface system 135 includes a set of new commands 150 to reflect operations for the new type of storage server 130 that is not applicable to the legacy type of storage server 125.

Figure 2:
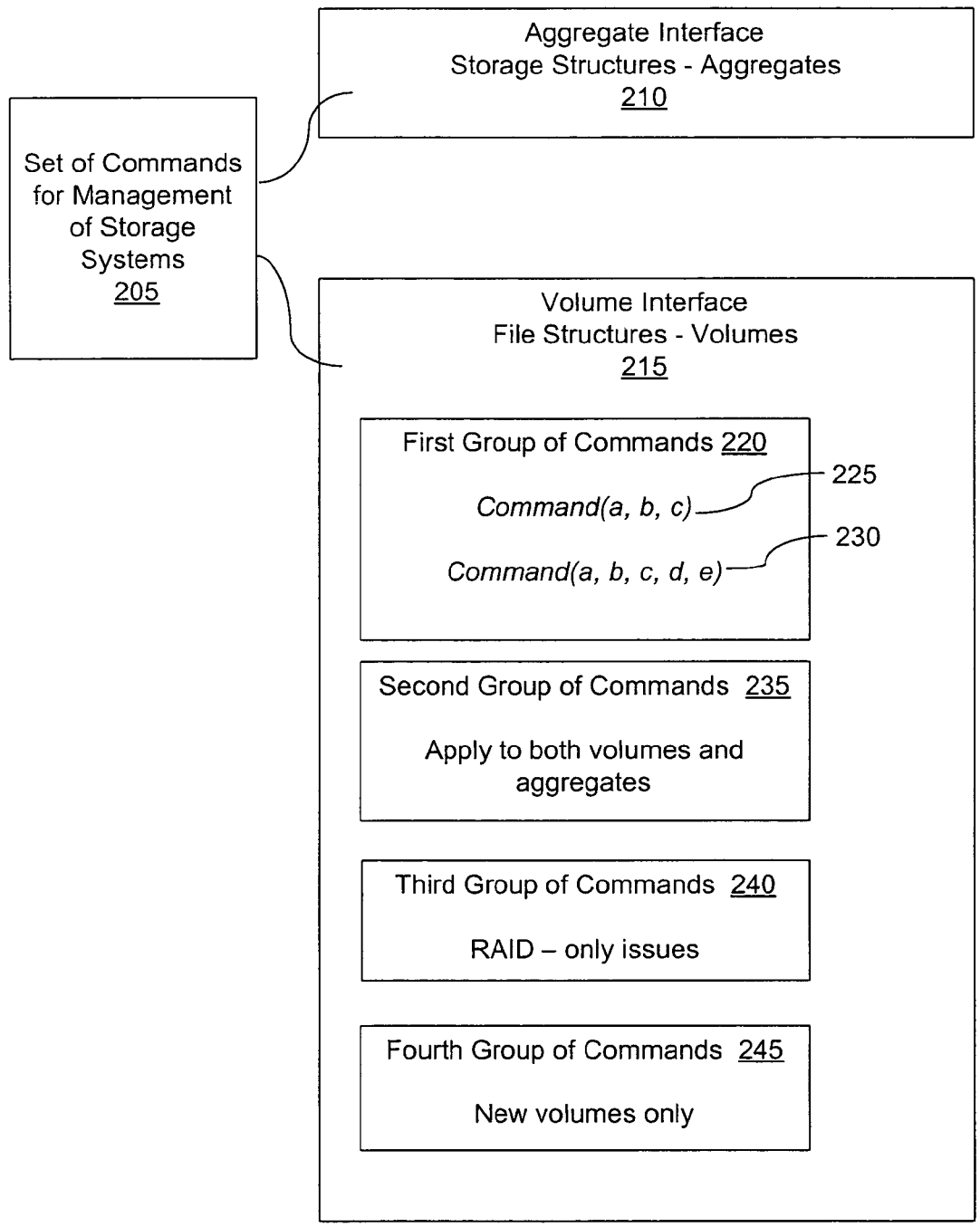
FIG. 2 illustrates an embodiment of interface commands for multiple storage systems.

FIG. 2 illustrates an embodiment of interface commands for multiple storage systems. In one embodiment, the multiple different storage systems may include a first type of storage system and a second type of storage system. The first type of storage system is a legacy storage system having file structures that are coextensive with storage structures. The second type of storage system is a revised storage system having storage structures that may each include zero or more file structures. In this environment, a set of commands for management of the storage systems 205 is divided into commands for a first interface 210 relating to the storage structures (an aggregate interface) and a second interface 215 relating to the file structures (a volume interface).

For the aggregate interface 210, the commands relate to storage structures for either a legacy storage system or a new storage system. The operations are the same at this level for both storage systems and thus the available commands and command arguments are the same for each of the systems.

For the volume interface 215, the second interface may include four groups of commands. A first group of commands 220 are commands for operations that exist for both types of storage systems, but that include different types of operations because of the differences in file structures for the storage systems. The commands in this case are differentiated by different sets of arguments for the legacy type of storage system and the new type of storage system. If a command relates to a file structure in the legacy type of storage system, the command will have a first set of arguments 225. If a command relates to a file structure in the new type of storage system, the command will have an extended second set of arguments 230. The extended set of arguments includes arguments that are only relevant for the new type of storage system. For example, a "create" command may have a certain number of arguments for volumes in the legacy storage server, but have additional arguments that relate to flexible volumes for the new type of storage system. In this manner, a command that previously applied only to a legacy file structure may also be extend for use in the new system.

A second group of commands 235 are commands that affect both volumes and aggregates. Such commands will make sense for both systems. The use of the appropriate volume or flexible volume name may be used as an argument for such commands.

A third set of commands 240 may be commands that have only RAID implications, such as a "mirror" command to provide a mirror image of a structure. The commands with RAID effects are not based upon the nature of the volume structures and thus will support both of the systems.

A fourth group of commands 245 relate only to new operations for the "flexible volumes" of the second storage system.

New commands to support these operations will only make sense for the new file structures will thus utilize the appropriate flexible volume name. If a volume name for the first storage server is used, an error condition will result. The addition of the new commands will have no effect on the first storage system.

Figure 3:
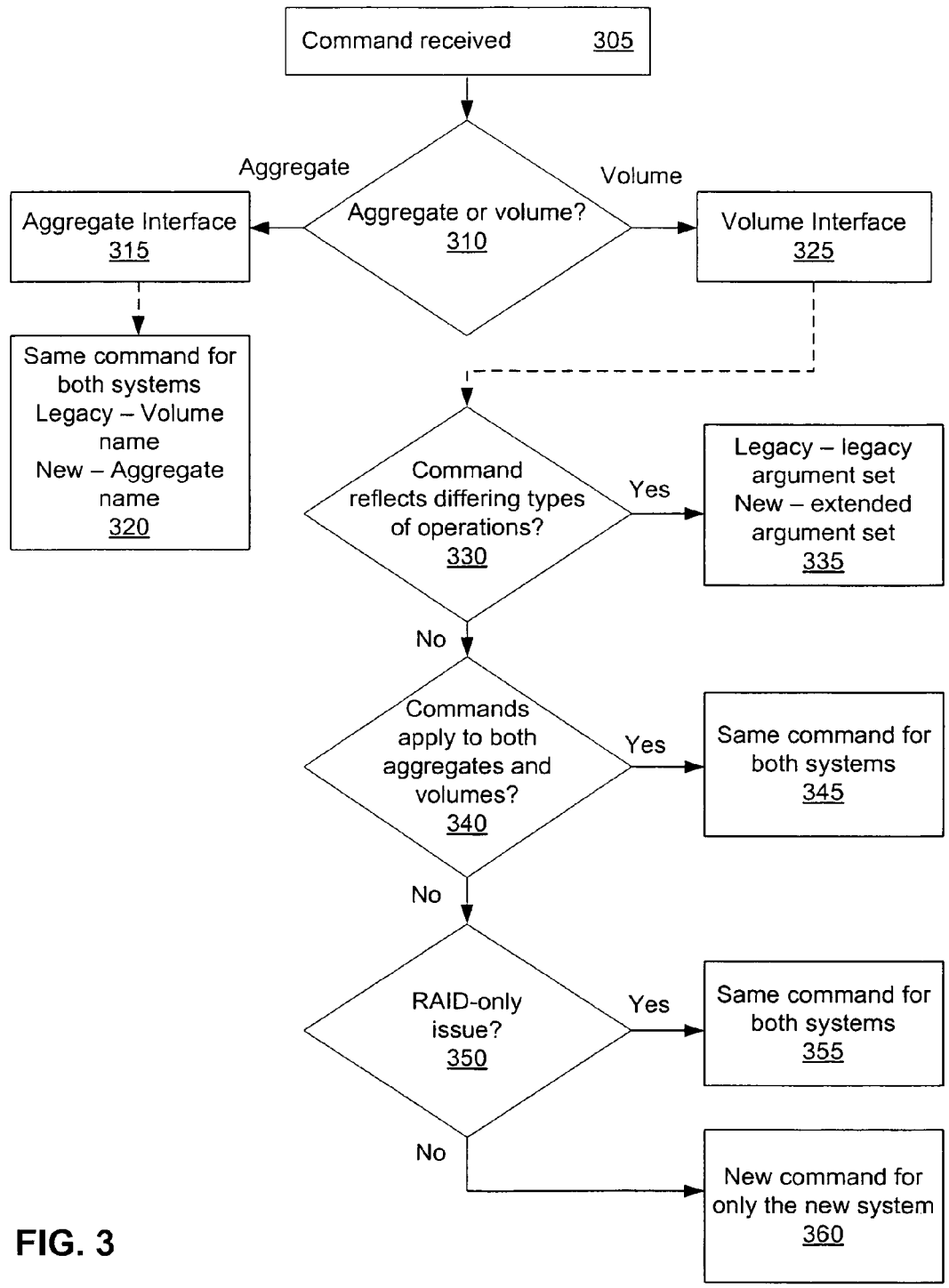
FIG. 3 is a flowchart illustrating an embodiment of processing of commands for managing multiple types of storage systems.

FIG. 3 is a flowchart illustrating an embodiment of processing of command by a storage server for managing multiple types of storage systems. In an embodiment, a command regarding management of data is received 305, the data being stored in a storage system. The command is either intended for a first type of storage system or a second type of storage system. In one embodiment, the first type of storage system is a system in which a file structure (a volume) is coextensive with a set of storage devices, such as a RAID set. The second type of storage system is a system in which a set of storage devices are included in a storage structure (an aggregate), and the storage structure may include zero or more file systems that may vary in size (flexible volumes).

If the command relates to storage structures or aggregates 310, the command is handled by the aggregate interface 315. If the command relates to file structures, the command is handled by the volume interface 325. If the command provides for different operations for the first and second type of storage systems 325, then there are is a different argument set for each of the systems 330.

If the command applies to both storage structures and file structures 335, then the same process may be used for the first and second types of storage systems 340. If the command addresses only RAID-level issues, then the process again will apply for the first and second types of storage systems 350. Otherwise the command is a new command that only applies to the second type storage system 355.

Figure 4:
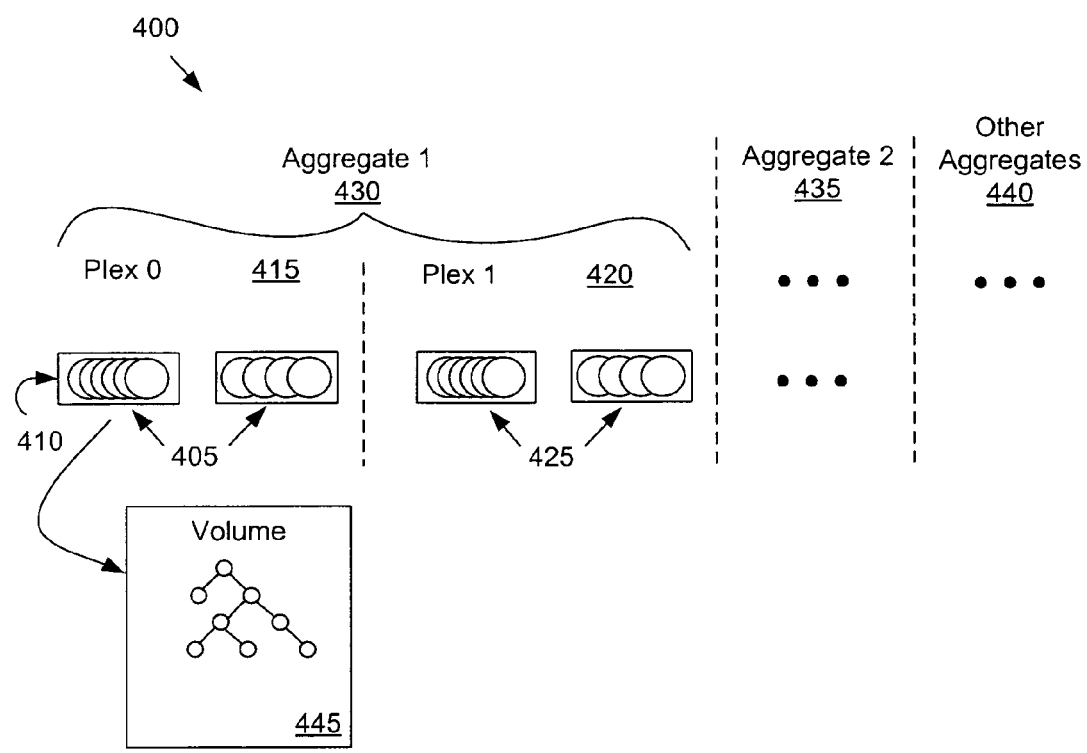
FIG. 4 is an illustration of data storage that may be accessed using an embodiment of the invention.

FIG. 4 is an illustration of data storage that may be addressed using an embodiment of the invention. While FIG. 4 illustrates one form of storage, data storage may be implemented in many different forms.

In an embodiment, a system includes a number of RAID groups, with each RAID group including some number of memory disks. The operation of the RAID groups may vary according the specification for the RAID group. Standard specifications includes RAID 1 for mirrored arrays, RAID 2 for parallel arrays with ECC (error checking and correction), RAID 3 for a parallel array with parity, RAID 4 for a striped array with parity, and RAID 5, for a striped array with rotating parity. Operations may further include RAID DP (double or diagonal parity), providing additional data protection. In one embodiment, a system utilizes RAID 4 or RAID DP, standards that protect against disk failure by computing parity information based on the contents of all of the disks in the array. A RAID 4 group thus includes a set of data disks and a parity disk that implements RAID 4, with a RAID DP group including two parity disks.

In an embodiment, a number of RAID groups may make up a group known as a plex, which is a collection of RAID groups. The use of plexes allow for mirroring a set of RAID groups, with a mirror being a copy of the data from the RAID groups. One or two plexes together, depending on whether a mirror exists, form an aggregate. An aggregate is a RAID protected area that provides storage.

A file server may include a number of volumes. In a first type of system or subsystem, aggregates and volumes are in a one to one relationship, each aggregate having one single volume and each volume including all of a single aggregate. In this first type of system of subsystem, an aggregate and a volume are thus coextensive in a one-to-one relationship with each other. Any modification of the size of a volume thus requires that a disk be added. In such structure, the smallest possible volume is two disks, with one disk containing data and a second disk containing parity information. In a second type of system or subsystem, aggregates and volumes are not tied in a one-to-one relationship. Instead, an aggregate may contain multiple volumes, and the volumes may be adjusted in size in smaller increments. In the second type of system, "cloning" of volumes in an aggregate is possible, with a clone in this context being a writable snapshot of a volume.

In this illustration, a storage server 400 provides storage in the form of, for example, a number of different RAID groups 405. Each RAID group includes two or more disks 410 for RAID 4 operations (or three or more disks for RAID DP operations). A number of RAID groups 405 form a plex 415, shown as plex 0. The plex 415 is a part of an aggregate 1 430. The aggregate may be mirrored or unmirrored, with a mirror being a copy. If aggregate 1 430 is mirrored, then it also includes plex 1. The storage server 400 may also include other aggregates, shown as aggregate 2 435 and other aggregates 440, which would contain their own data storage disks.

Aggregate 1 430 may include a volume 445, with a volume being a logical unit of storage. A traditional volume is coextensive with the aggregate, the aggregate containing one volume. Any modification in the size of a traditional volume requires an increase in the size of the RAID groups 405 making up the aggregate. A flexible volume is a different type of volume that can be of varying sizes and is not tied to an aggregate. An aggregate can contain multiple flexible volumes. In an embodiment of the invention, the storage server 400 may include traditional (or legacy) volumes, flexible volumes, or both.

In one embodiment of the invention, commands for management of storage may be processed by an interface system that supports multiple kinds of storage systems.

Figure 5:
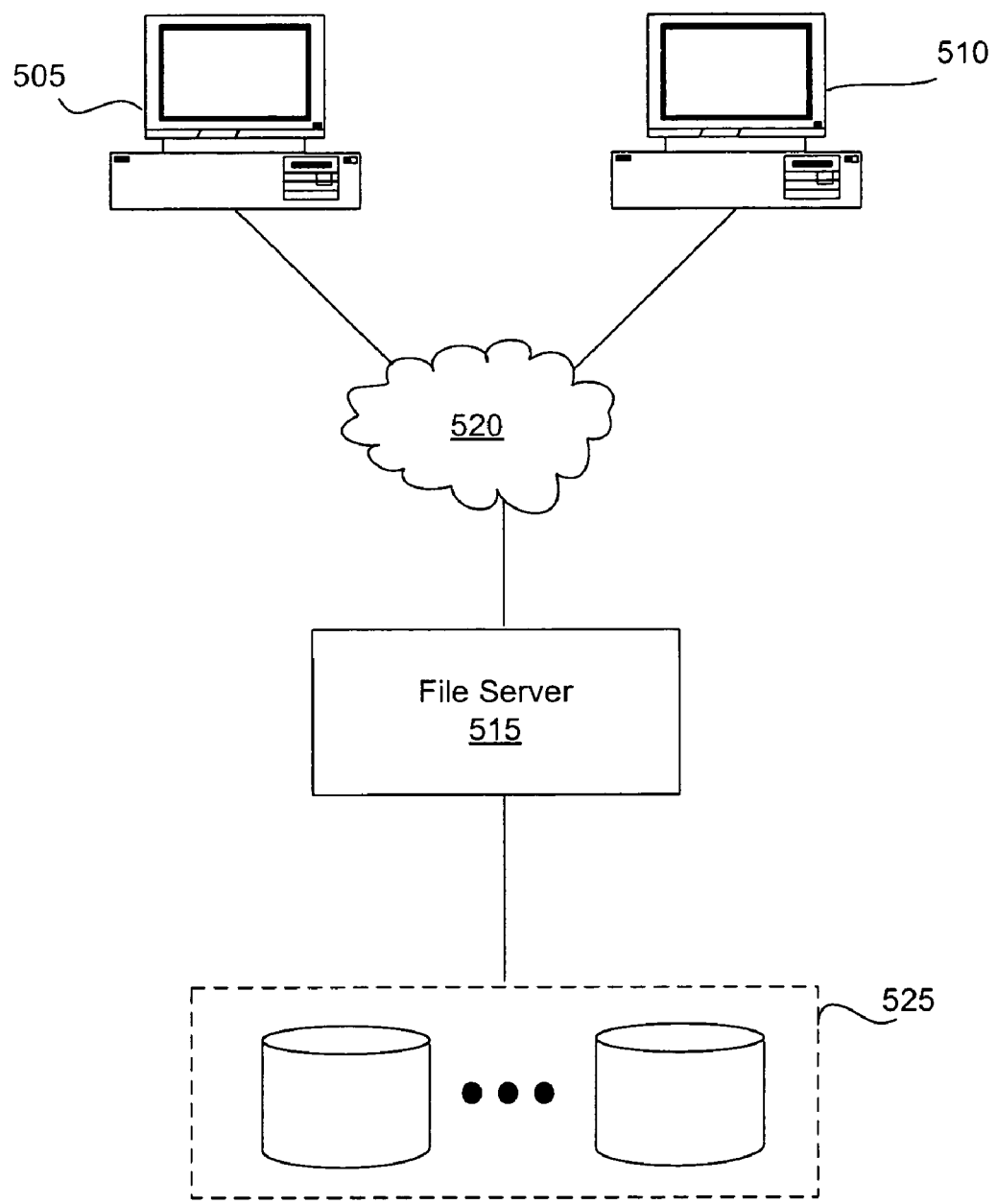
FIG. 5 illustrates a network environment that includes a file server that implements an embodiment of the invention.

An embodiment of the invention may be implemented in a file server. FIG. 5 illustrates a network environment that includes a file server that implements an embodiment of the invention. A file server 515 shown in FIG. 5 is coupled locally to a storage subsystem 525, which includes a set of mass storage devices, and to a set of clients, shown as a first client 505 and a second client 510, through a network 520, such as a local area network (LAN). Each of the clients may be, for example, a conventional personal computer (PC), workstation, or the like. The storage subsystem 525 is managed by the file server 515. The file server 515 receives and responds to various read and write requests from the clients that are directed to data stored in or to be stored in the storage subsystem 525. The mass storage devices in the storage subsystem 525 may be, for example, conventional magnetic disks, optical disks such as CD-ROM or DVD based storage, magneto-optical (MO) storage, or any other type of non-volatile storage devices suitable for storing large quantities of data.

The file server 515 may have a distributed architecture; for example, it may include a separate N- ("network") blade and D- ("disk") blade (not shown). In such an embodiment, the N-blade is used to communicate with clients 505 and 510, while the D-blade includes the file system functionality and is used to communicate with the storage subsystem 525. The N-blade and D-blade communicate with each other using an internal protocol. Alternatively, the file server 515 may have an integrated architecture, where the network and data components are all contained in a single box. The file server 515 further may be coupled through a switching fabric to other similar file servers (not shown) that have their own local storage subsystems. In this way, all of the storage subsystems can form a single storage pool, to which any client of any of the file servers has access.

In an embodiment of the invention, the first client 505 and second client 510 use an interface system to communicate with the file server 515 and provide for data management. In one embodiment, the interface system supports multiple different kinds of storage systems.

Figure 6:
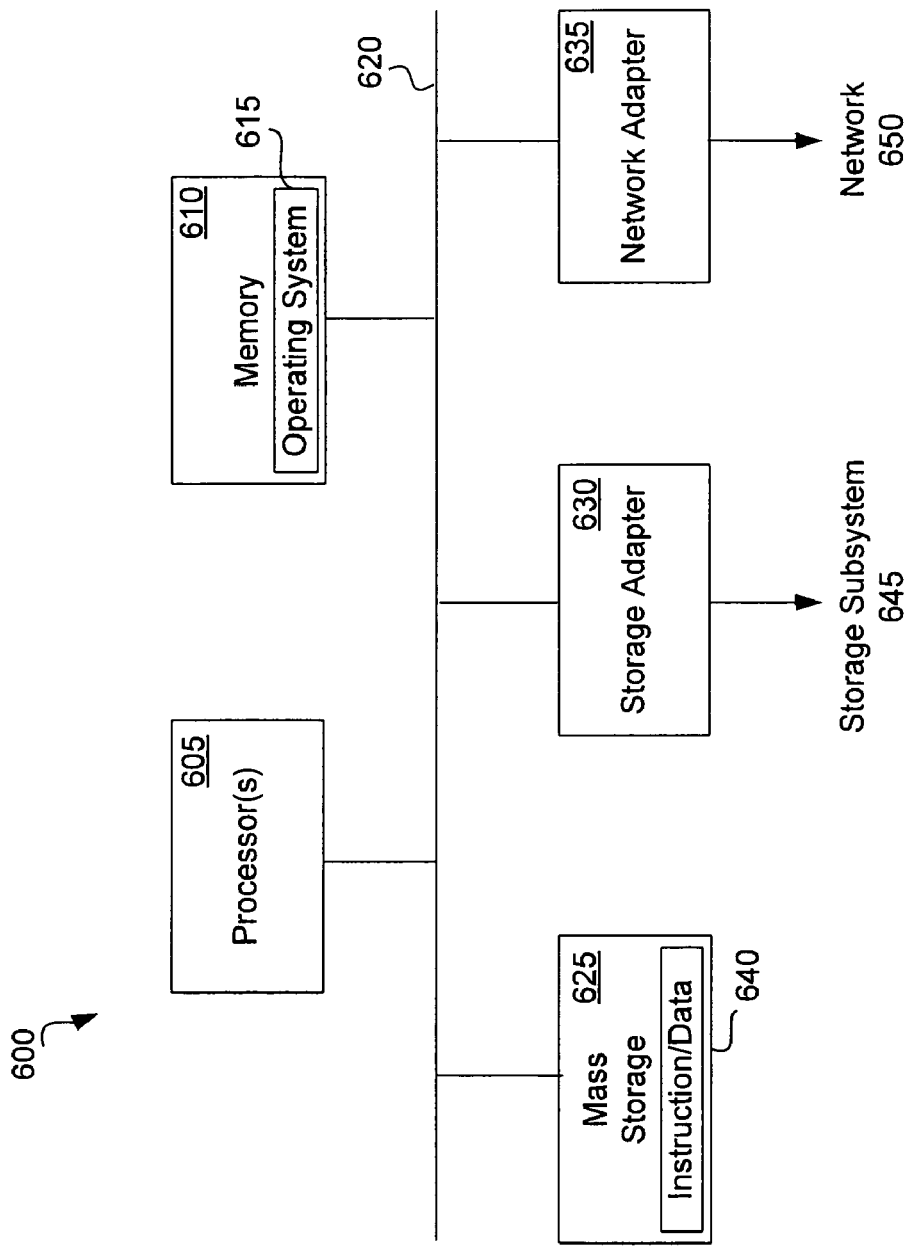
FIG. 6 is a block diagram illustrating an architecture of a file server that may implement an embodiment of the invention.

FIG. 6 is a block diagram illustrating an architecture of a file server that may implement an embodiment of the invention. Certain standard and well-known components that are not germane to the present invention may not be shown. A file server 600 includes one or more processors 605 and memory 610 coupled to a bus system 620. The bus system 620 shown in FIG. 6 is an abstraction that represents any one or more separate physical buses, point-to-point connections, or both connected by appropriate bridges, adapters, or controllers. The bus system 620, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus, sometimes referred to as "Firewire". ("Standard for a High Performance Serial Bus" 1394-1995, IEEE, published Aug. 30, 1996, and supplements)

The processors 605 are the central processing units (CPUs) of the file server 600 and, thus, control the overall operation of the file server 600. In certain embodiments, the processors 605 accomplish this by executing software stored in memory 610. A processor 605 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 610 is or includes the main memory of the file server 600. Memory 610 represents any form of random access memory (RAM), read-only memory (ROM), flash memory, or the like, or a combination of such devices. Memory 610 stores, among other things, the operating system 615 of the file server 600.

Also connected to the processors 605 through the bus system 620 are one or more internal mass storage devices 625, a storage adapter 630 and a network adapter 635. Internal mass storage devices 625 may be or include any conventional medium for storing large volumes of instructions and data 640 in a non-volatile manner, such as one or more magnetic or optical based disks. The storage adapter 630 allows the file server 600 to access a storage subsystem 645 and may be, for example, a Fibre Channel adapter or a SCSI adapter. The network adapter 635 provides the file server 600 with the ability to communicate with remote devices, such as the clients 405 and 410 illustrated in FIG. 4, over a network 650 and may be, for example, an Ethernet adapter.

Figure 7:
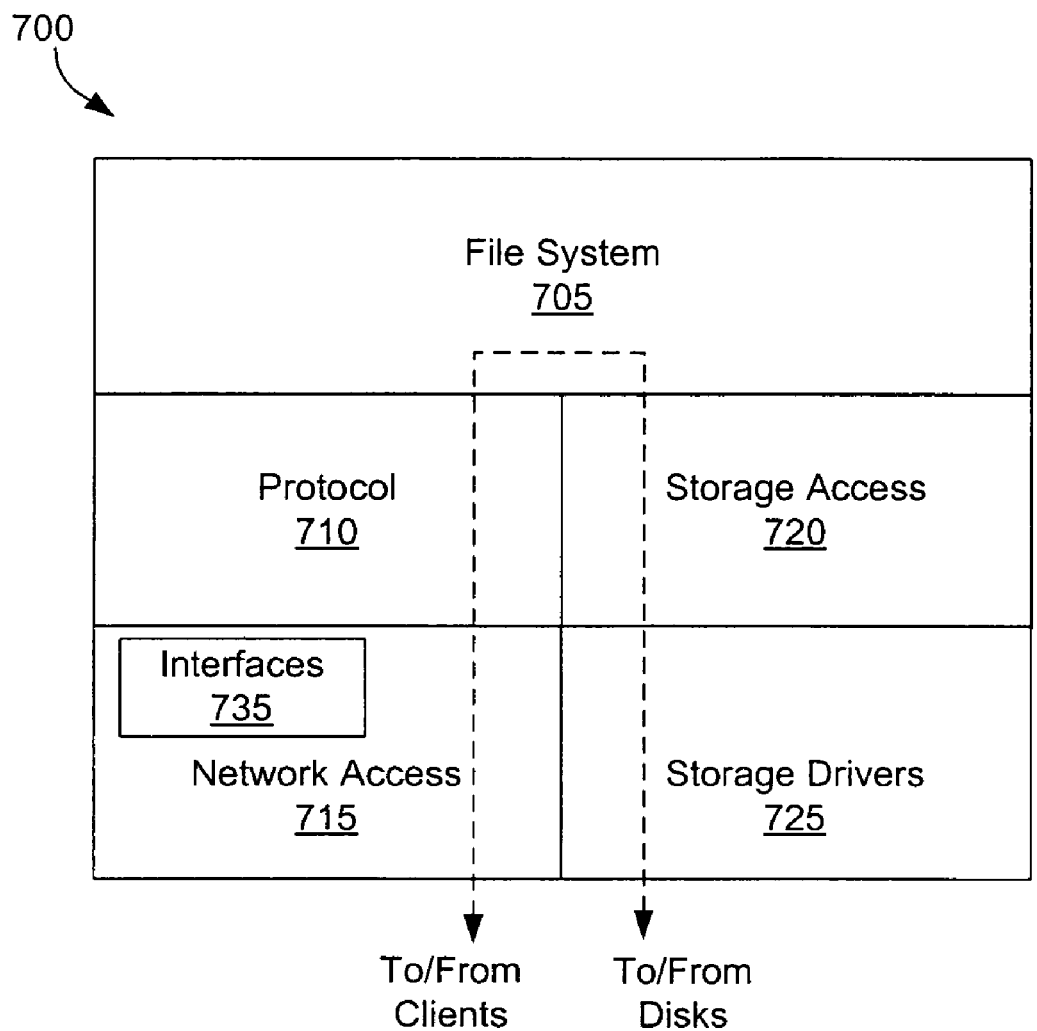
FIG. 7 is a block diagram showing an operating system of a file server according to an embodiment of the invention.

FIG. 7 shows an example of an operating system of a file server according to an embodiment of the invention. As shown, an operating system 700 includes several modules, or "layers". These layers include a file system 705. The file system 705 is application-layer software that keeps track of the directory structure (hierarchy) of the data stored in a storage subsystem and manages read/write operations on the data (i.e., executes read/write operations on the disks in response to client requests). Logically "under" the file system 705, the operating system 700 also includes a protocol layer 710 and an associated network access layer 715, to allow a file server to communicate a network, such as clients. The protocol 710 layer implements one or more of various higher-level network protocols, such as Network File System (NFS), Common Internet File System (CIFS), Hypertext Transfer Protocol (HTTP) and/or Transmission Control Protocol/Internet Protocol (TCP/IP). The network access layer 715 includes one or more drivers that implement one or more lower-level protocols to communicate over the network, such as Ethernet. The network access layer 715 may incorporate interfaces with clients 735.

Also logically under the file system 705, the operating system 700 includes a storage access layer 720 and an associated storage driver layer 725, to allow a file server to communicate with a storage subsystem. The storage access layer 720 implements a higher-level disk storage protocol, such as RAID, while the storage driver layer 725 implements a lower-level storage device access protocol, such as Fibre Channel Protocol (FCP) or SCSI. To facilitate description, it is henceforth assumed herein that the storage access layer 720 implements a RAID protocol, such as RAID-4 or RAID DP, and therefore may alternatively be referred to as RAID layer 720. Also shown in FIG. 7 is path 730 of data flow through the operating system 700 associated with a read or write operation.

Thus, a method and apparatus for shared implementation for multiple system interfaces have been described. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A system comprising:
    a storage server that can maintain a plurality of volumes of data, the storage server being of either a first type or a second type, the first type characterized in that each volume maintained by the storage server must have a fixed relationship to an aggregate, the second type characterized in that at least one volume maintained by the storage server can have a variable relationship to an aggregate, wherein an aggregate is a set of physical storage devices; and
    a client interface system for management of the storage server by a client, the client interface system including commands that are compatible with both a storage server of the first type and a storage server of the second type, the interface system to enable an external entity to access the storage server;
    wherein the client interface system includes:
        a first interface to handle commands for physical storage structures of storage systems; and
        a second interface to handle commands for file structures of storage systems.

2. The system of claim 1, wherein the first type of storage system is a legacy storage system and the second type of storage system is a modified version of the legacy storage system.

3. The system of claim 2, wherein the client interface system retains all commands of a legacy interlace for the first type of storage system.

4. A storage server comprising:
    a network adapter, the network adapter to provide communications with one or more clients; and a storage adapter, the storage adapter to provide communications with one or more storage servers, the storage adapter including interface logic to enable management of:
  a first type of storage server that can maintain a plurality of volumes of data, where each volume maintained by the first type of storage server must be coextensive with an aggregate, wherein an aggregate is a set of physical storage devices, and
  a second type of storage server that can maintain a plurality of volumes of data, where at least one volume maintained by the second type of storage server can have a variable relationship to a data aggregate;
wherein the interface logic includes:
  a first client interface to handle commands regarding physical storage structures of storage systems; and
  a second client interface to handle commands regarding file structures of storage systems.

5. The storage server of claim 4, wherein the storage adapter supports commands of a legacy interface for the first type of storage server.

6. The storage server of claim 5, wherein the storage adapter further supports commands that apply only to the second type of storage server.

7. A method comprising:
receiving a storage management command destined for a storage server; and
processing the storage management command by using a storage management interface system that supports storage management commands of both a first type of storage server and a second type of storage server, wherein a storage server of the first type manages data storage defined to include at least one volume and at least one aggregate and requires each volume to be coextensive with an aggregate, wherein a storage server of the second type manages data storage defined to include at least one volume and at least one aggregate but does not require each volume to be coextensive with an aggregate, wherein an aggregate is a set of physical storage devices, and wherein processing the command includes:
  processing the command through a first interface of the storage management interface system if the command relates to an aggregate; and
  processing the command through a second interface of the storage management interface system if the command relates to a volume.

8. The method of claim 7, wherein:
the first interface handles a first command that is supported by both the first type of storage server and the second type of storage server; and
the second interface handles a second command that is supported by both the first type of storage server and the second type of storage server, and a third command that is supported by the second type of storage server but not the first type of storage server.

9. The method of claim 7, wherein the second interlace further supports a fourth command which is supported by both the first type of storage server and the second type of storage server but which operates differently for the first type of storage server and the second type of storage server.

10. The method of claim 7, wherein the second command has the same set of arguments for the first type of storage server and the second type of storage server; and
wherein the second interface further supports a fourth command which is supported by both the first type of storage server and the second type of storage server but which has a different set of arguments for the first type of storage server and the second type of storage server.

11. The method of claim 7, wherein the second interface is configured to handle a command that applies to both a volume and an aggregate.

12. The method of claim 7, wherein the second interface is configured to handle a command for a RAID operation.

13. The method of claim 7, wherein the third command applies only to file structures of the second type of storage system.

14. A system comprising:
a storage server; and
a storage management interface system to manage the storage server, the management interface system supporting storage management commands of both a first type of storage server and a second type of storage server, wherein a storage server of the first type manages data storage defined to include at least one volume and at least one aggregate and requires each volume to be coextensive with an aggregate, wherein a storage server of the second type manages data storage defined to include at least one volume and at least one aggregate but does not require each volume to be coextensive with an aggregate, and wherein an aggregate is a set of physical storage devices, the storage management interface system including
  a first interface to handle aggregate-level storage management commands, including a first command that is supported by both the first type of storage server and the second type of storage server; and
  a second interface to handle volume-level storage management commands, including a second command that is supported by both the first type of storage server and the second type of storage server, and a third command that is supported by the second type of storage server but not the first type of storage server.

15. The system of claim 14, wherein the second interface further supports a fourth command which is supported by both the first type of storage server and the second type of storage server but which operates differently for the first type of storage server and the second type of storage server.

16. The system of claim 14, wherein the second command has the same set of arguments for the first type of storage server and the second type of storage server; and
wherein the second interface further supports a fourth command which is supported by both the first type of storage server and the second type of storage server but which has a different set of arguments for the first type of storage server and the second type of storage server.

17. The system of claim 14, wherein the second interface is configured to handle a command that applies to both a volume and an aggregate.

18. The system of claim 14, wherein the second interface is configured to handle a command for a RAID operation.

19. The system of claim 14, wherein the third command applies only to file structures of the second type of storage system.

20. A system comprising:
a storage server; and
a storage management interface system to manage the storage server, the management interface system supporting storage management commands of both a first type of storage server and a second type of storage server, wherein a storage server of the first type manages data storage defined to include at least one volume and at least one aggregate and requires each volume to be coextensive with an aggregate, wherein a storage server of the second type manages data storage defined to include at least one volume and at least one aggregate but does not require each volume to be coextensive with an aggregate, and wherein an aggregate is a set of physical storage devices, the storage management interface system including a storage management interface system to manage the data storage system, the management interface system supporting management commands of both the first type of storage server and the second type of storage server, the storage management interface system including a first interface to handle aggregate-level storage management commands, including a first command that is supported by both the first type of storage server and the second type of storage server; and a second interface to handle volume-level storage management commands, including a second command that is supported by both the first type of storage server and the second type of storage server, a third command that is supported by the second type of storage server but not the first type of storage server, and a fourth command which is supported by both the first type of storage server and the second type of storage server but has a different set of arguments for the first type of storage server and the second type of storage server.

21. The system of claim 20, wherein the second interface is configured to handle a command that applies to both a volume and an aggregate.

22. The system of claim 20, wherein the second interface is configured to handle a command for a RAID operation.

23. The system of claim 20, wherein the third command applies only to file structures of the second type of storage system.

* * * * *